(12) United States Patent
Parisel et al.

(10) Patent No.: US 8,273,299 B2
(45) Date of Patent: Sep. 25, 2012

(54) REACTOR COOLING SYSTEM

(75) Inventors: Marc Parisel, Vilvoorde (BE); Brent Walworth, Sint-Niklaas (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 188 days.

(21) Appl. No.: 12/735,353

(22) PCT Filed: Feb. 4, 2009

(86) PCT No.: PCT/EP2009/051250
§ 371 (c)(1),
(2), (4) Date: Jul. 8, 2010

(87) PCT Pub. No.: WO2009/101008
PCT Pub. Date: Aug. 20, 2009

(65) Prior Publication Data
US 2010/0276117 A1    Nov. 4, 2010

(30) Foreign Application Priority Data

Feb. 12, 2008   (EP) .................................... 08101529

(51) Int. Cl.
*B01J 19/00* (2006.01)
*F25B 29/00* (2006.01)

(52) U.S. Cl. ............. 422/138; 422/202; 165/61; 165/65

(58) Field of Classification Search .................. 422/138, 422/202; 165/61, 65
See application file for complete search history.

(56) References Cited

U.S. PATENT DOCUMENTS

| 2,371,381 A | 3/1945 | Campbell et al. |
| 2,788,264 A | 4/1957 | Bremer et al. |
| 3,229,754 A | 1/1966 | Hoag |
| 6,235,852 B1 | 5/2001 | Hess et al. |

FOREIGN PATENT DOCUMENTS

| EP | 0 516 037 A2 | 12/1992 |
| EP | 0 516 037 A3 | 12/1992 |

*Primary Examiner* — Walter D Griffin
*Assistant Examiner* — Lessanework Seifu
(74) *Attorney, Agent, or Firm* — Nixon & Vanderhye

(57) ABSTRACT

Process for removing heat from at least two reactors forming at least part of a polymerization reactor system for a multimodal polymerization in which the reactors are linked in series and all produce at least one component of the same polymer. The process includes cooling a stream of fluid in one or more heat exchangers and passing part of it to the cooling system of a first reactor and part of it to the cooling system of a second reactor, so as to remove the heat from said reactors, and passing back through the heat exchangers a return flow having a portion of the combined exit flows of the cooling fluids used to remove the heat from each of the reactors. The heat exchangers provide at least 90% of the cooling requirement for the reactors, and a portion of the combined exit flows from the reactors bypasses at least one of the heat exchangers and is passed directly to the cooling system of one or more of the reactors. The cooling circuit is powered by no more than one pump at any one time.

9 Claims, 4 Drawing Sheets

REACTOR COOLING SYSTEM

This application is the U.S. national phase of International Application No. PCT/EP2009/051250 filed 4 Feb. 2009 which designated the U.S. and claims priority to European Patent Application No. 08101529.9 filed 12 Feb. 2008, the entire contents of each of which are hereby incorporated by reference.

The present invention relates generally to a cooling system for removing heat from polymerisation reactors, and more particularly to a system for removing heat from at least two polymerisation reactors which produce at least some of the components of a single polymer.

BACKGROUND OF THE INVENTION

Polymers such as polyethylene or polypropylene are generally produced in industrial quantities by petrochemical facilities, which have ready access to the monomeric feedstocks. The polymerization process itself is usually exothermic, and is typically performed in closed systems where temperature and pressure can be regulated to maximize production. As with any such closed system where heat is generated, it is necessary to remove most of the heat in order to control the polymerization temperature. Thus the reactors in which the polymerisation is conducted are usually provided with coolant systems to remove the heat.

A typical form of coolant system comprises a jacket surrounding the polymerisation reactor through which is passed coolant to remove the heat from the reactor. The coolant itself usually circulates via a heat exchanger, where the heat removed from the reactor is given up.

Although many polymerisation processes involve the use of only a single polymerisation reactor, increasing numbers utilise two or more reactors, the products of which are combined. The reactors may produce identical or different products, and may be arranged in parallel or in series. A common application is to make one polymer in a first reactor, and then transfer the polymer to a second reactor where a further polymer is made in the presence of the first polymer (so-called "multimodal" polymerisation). Such reactor systems may comprise liquid-phase or gas-phase reactors or a combination thereof.

Many multiple reactor systems employ one or more loop reactors, which are of a continuous tubular construction comprising at least two, for example four, vertical sections and at least two, for example four, horizontal sections. In such a reactor, reactants are fed into the continuous tube containing a solvent and a catalyst. The admixture of diluent, reactants, and catalyst are continuously recycled around the tube, with the reaction product being continuously removed. The heat of polymerisation is typically removed using indirect exchange with a cooling medium, preferably water, in jackets surrounding at least part of the tubular loop reactor. A typical loop reactor is shown in FIG. 8 of WO 2006/026493, and a conventional system for cooling such a reactor is shown in FIG. 9 of the same patent application. This shows a cooling circuit comprising a cold coolant supply to the reactor jackets, and a return supply of warmer coolant from the jackets, "carrying" the heat from the reactor. The heat is removed from the coolant in heat exchangers, and the re-cooled coolant recirculates into the reactor jackets. The coolant is cooled in heat exchangers and recirculated rather than being supplied directly from a cold source such as a cooling tower so as to avoid fouling caused by untreated or only partially treated water: the circulating coolant (usually water) in the circuit can be treated.

It is usual for the reactors in multiple reactor polymerisations each to have its own independent cooling circuit and heat exchanger, since the cooling requirements of each reactor, where different polymerisation reactions are taking place, are usually different. However in U.S. Pat. No. 6,235,852 a single heat exchanger is used to supply the cooling circuits for two or more reactors. This is said to be possible because of the lower heat removal requirements in subsequent reactors due to ageing of the catalyst. A bypass line directly from the cooling circuit of one reactor to the other is also disclosed. We have found that it is possible to improve the above design by integrating the two cooling circuits further so that they are effectively a single circuit, thereby providing a simpler and more controllable cooling system.

SUMMARY OF THE INVENTION

Accordingly in a first aspect the present invention provides a cooling circuit for at least two reactors which form at least part of a polymerisation reactor system, which circuit comprises:
one or more heat exchangers which provide at least 90% of the cooling requirement for the cooling circuit;
a cold flow of cooling fluid exiting the one or more heat exchangers, part of which cold flow passes into a first inlet flow directed to the cooling system of a first reactor, and part of which passes into a second inlet flow directed to the cooling system of a second reactor;
a return flow comprising the combined exit flows of the cooling fluids used to remove the heat from each of the reactors;
wherein a portion of the return flow is diverted to bypass the heat exchangers, and is wholly or partly incorporated into at least one of the first and second inlet flows.

A further aspect of the present invention provides a process for removing heat from at least two reactors forming at least part of a polymerisation reactor system, comprising:
cooling a stream of fluid in one or more heat exchangers and passing part of it to the cooling system of a first reactor and part of it to the cooling system of a second reactor, so as to remove the heat from said reactors;
passing back through the heat exchangers a return flow comprising a portion of the combined exit flows of the cooling fluids used to remove the heat from each of the reactors;
wherein the heat exchangers provide at least 90% of the cooling requirement for the reactors, and a portion of the combined exit flows from the reactors bypasses at least one of the heat exchangers and is passed directly to the cooling system of one or more of the reactors.

A significant difference between the arrangement of the present invention and that of U.S. Pat. No. 6,235,852 is that in the present invention the exit flows from the reactors are combined before by-pass of the heat exchanger. By contrast in U.S. Pat. No. 6,235,852 the heat exchanger is bypassed either by passing some of the flow exiting the cooling jacket of one reactor directly to the cooling jacket of the other reactor, and/or by simply returning the exit flow of each cooling jacket direct to the entry flow of that jacket. The advantage of the present invention is that by first combining the exit flows from the reactors, a return flow is obtained having a temperature which is a weighted average of the two exit flows, thereby allowing the bypass portion of this flow to be used to cool either or both reactors. In U.S. Pat. No. 6,235,852 such flexibility is not available. Additionally, combining the exit flows before bypass of the heat exchanger allows the return flow and bypass to be controlled by a single pump, whereas in U.S. Pat. No. 6,235,852 an additional pump is required in order to ensure that some flow enters the by-pass line. It is preferred therefore in the present invention that the cooling circuit is powered by no more than one pump at any one time.

Preferably the heat exchangers provide at least 95% of the cooling requirement for the reactors, and more preferably they provide at least 97%. A significant advantage of the invention is that the total cooling capacity of the heat exchanger(s) can often be less than 90% and sometimes less than 80% of the sum of the individual maximum cooling requirements of each of the reactors. This is because the reactors do not generally all require maximum cooling at the same time: this is more especially the case when the reactors form part of a multimodal polymerisation system.

In the case where there is more than one heat exchanger, a portion of the return flow usually bypasses all of the heat exchangers.

It is preferred that the reactors which form at least part of the polymerisation system all produce at least one component of the same polymer: this means that their production is linked. It is particularly preferred that the reactors are linked in series. We have found that in such cases the present invention is especially advantageous because the total capacity of the heat exchangers required for the cooling circuit is less than the sum of the heat exchanger capacities that would be required for the same polymerisation reactor system if each reactor had its own separate cooling circuit. This can result in significant capital cost reduction and energy savings. Furthermore, despite having only a single cooling circuit to cool all the reactors, we have found that the cooling circuit of the invention is flexible enough to be able to provide sufficient cooling to all the reactors even if their relative rates of production (and hence cooling requirements) change.

Usually the cooling circuit of the invention comprises a single heat exchanger. Alternatively two or more heat exchangers may be utilised, either in series or in parallel. However in most arrangements the cooled flows are combined before being split between the two reactors.

The number of reactors cooled by the cooling circuit of the invention is usually two, but the invention is not so limited: it is possible that three or even four reactors may be treated by the single circuit, in which case the cold flow is split between all of the reactors.

In a preferred embodiment, part of the portion of the return flow which bypasses the heat exchangers ("bypass portion") passes into the first flow to the first reactor, and part of the bypass portion passes into the second flow to the second reactor. If there are more than two reactors being cooled by the cooling circuit of the invention, the bypass portion of the return flow may be split between the inlet flows for some or all of the reactors.

Transport of the fluid around the cooling circuit is typically powered by one or more pumps. Preferably a pump is located in the cooling circuit return flow formed from the combined exit flows from the two reactors, usually upstream of the separation of the return flow into two portions. A standby pump is always employed, in order to ensure that continued cooling takes place in the event of a pump failure.

It is preferred that the cooling circuit is a closed circuit: that is to say that no fluid is added to or removed from the circuit at any point. However it is possible that additional cold fluid may be added to the circuit, usually at a point between the heat exchangers and the point of separation of the cold flow. Obviously in such cases a corresponding amount of fluid is extracted from elsewhere in the cooling circuit after it has passed through the reactor cooling system.

The reactor cooling system is preferably a jacket or jackets surrounding the reactor over part or all of its surface. The reactors themselves are preferably loop reactors, in which case the reactor cooling system for each reactor comprises a series of concentric jackets enclosing the straight portions of the loop.

Although the reactor cooling circuit of the invention may be applied to any polymerisation system involving more than one reactor, it is most suitable for multimodal polymerisation reactions involving two more reactors connected in series. Bimodal slurry polymerisations utilising just two reactors in series are most preferred. In such polymerisations, a first polymer is made in one reactor, and the reaction mixture transferred to a second reactor where a second polymer is made in the presence of the first. The properties of the final polymer depend on the properties and relative proportions of the individual polymers. Thus the polymerisation conditions in the two reactors are linked, which means that there is also a linkage between the cooling requirements of the two reactors. It is often the case that an increase in the cooling requirement in one reactor is linked to a reduced cooling requirement in the other reactor, for example if the majority of the polymer is made in one reactor. The present invention is particularly suitable for such arrangements, because it makes more efficient use of the total cooling requirement. As a result of this, a polymerisation plant constructed with a single cooling circuit according to the present invention is sufficiently flexible to be able to accommodate production of a range of different bimodal products for which there are different cooling requirements in the two reactors (due to different production rates, temperatures etc in the two reactors depending on the exact product being made).

BRIEF DESCRIPTION OF THE DRAWINGS

Specific embodiments of the invention will not be described with reference to the accompanying drawings, in which.

DETAILED DESCRIPTION OF PREFERRED EMBODIMENTS

Figure 1:
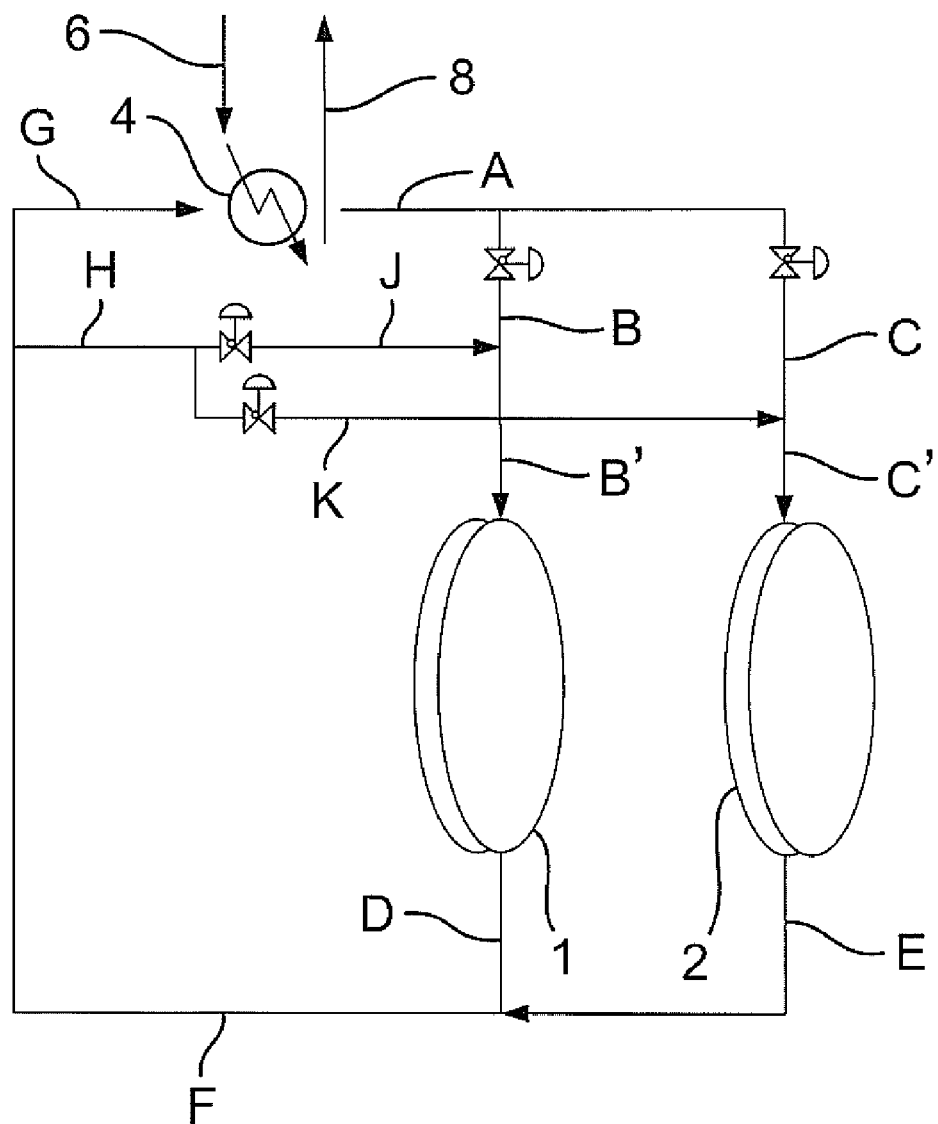
FIG. 1 is a schematic diagram of the cooling circuit of the invention for two reactors.

FIG. 1 shows two loop reactors 1 and 2 and the single cooling circuit which cools both of them. The relationship between the two reactors is not shown: in these Examples, they are connected in series. The circuit comprises a heat exchanger or exchangers 4 (only one exchanger is shown and discussed for simplicity) having an inlet flow 6 and outlet flow 8 from a source of cold water, such as a cooling tower. The other side of the heat exchanger is part of the cooling circuit, and the output therefrom produces a flow of cold water A. Flow A is split into two flows B and C, flow B going to Reactor 1 and flow C going to Reactor 2. Flows B and C become B' and C' respectively as discussed below, and pass through jackets surrounding the respective reactors so as to cool the polymerisation reactions therein. They exit the reactor jackets as flows D and E, which merge to form a return flow of warm water F.

Part of flow F returns to the heat exchanger (flow G) to be re-cooled and become flow A again. However part of flow F is diverted as flow H to bypass the heat exchanger altogether. In some embodiments of the invention, flow H passes direct into either flow B or flow C. However in this embodiment it is further split to form uncooled flows J and K. J merges with cooled flow B to form flow B', and K merges with cooled flow C to form flow C'.

A heater (not shown) is usually incorporated in the coolant circuit to enable heating of the reactor before or during start-up. The circuit may be driven by a single pump, which is typically located in line F.

Figure 2:
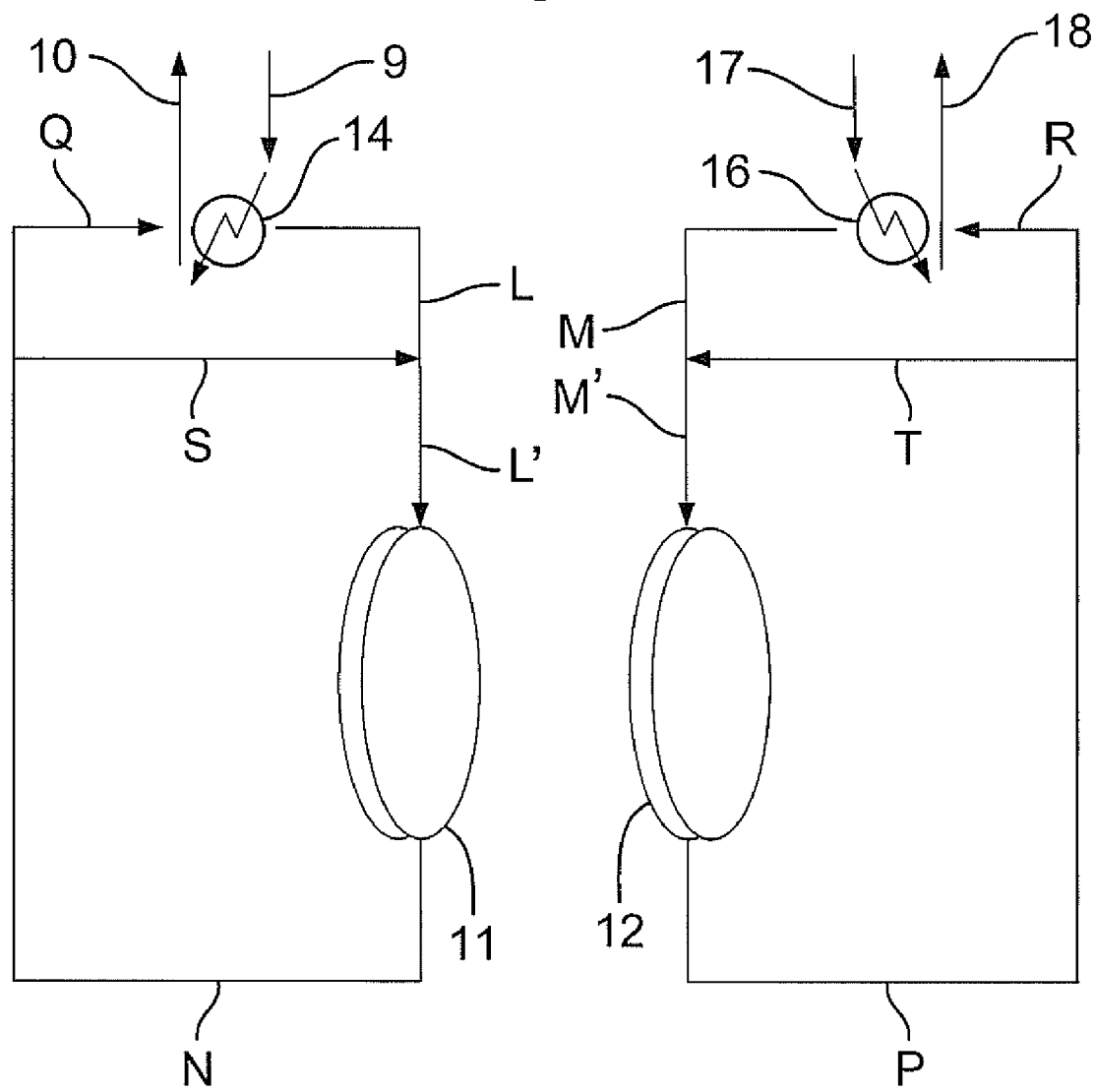
FIG. 2 is a schematic diagram of an alternative cooling arrangement for two reactors utilising a separate cooling circuit for each reactor, which is outside the scope of the invention.

FIG. 2 is an alternative arrangement outside the scope of the invention, where each reactor has its own independent cooling circuit. In this case reactors 11 and 12 each have their own heat exchanger(s) 14 and 16 respectively, which provide respective inlet flows of cold water L and M. The heat exchangers 14 and 16 have respective inlet and outlet supplies of cold water from the cold water source (9, 10 and 17, 18). The respective exit flows N and P from reactors 11 and 12 are both divided such that part (Q, R) returns through the heat exchanger, and the remainder (S, T) bypasses the heat exchanger to pass directly back into the inlet flow (L, M) to form flow L' and M'.

Figure 3:
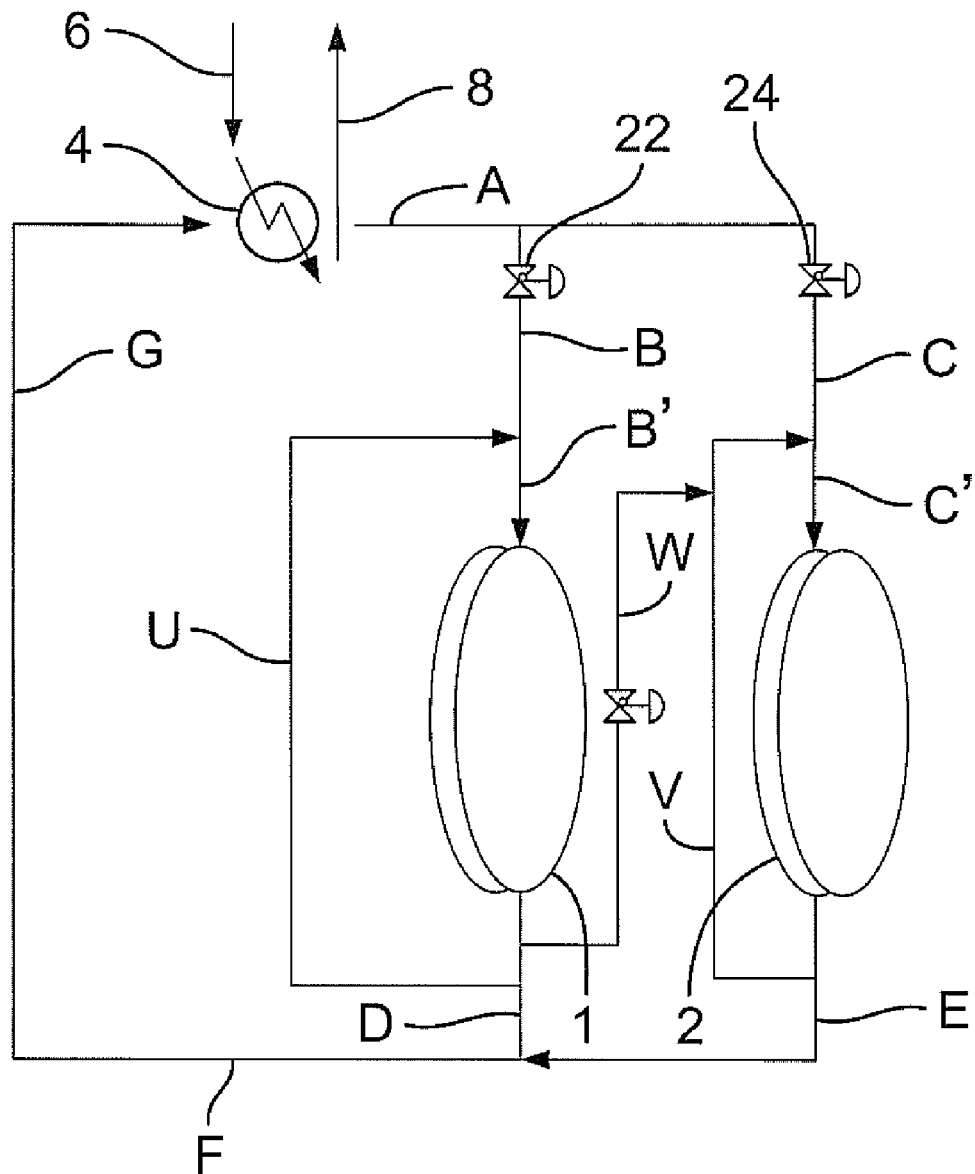
FIG. 3 is a schematic diagram of a further alternative arrangement outside the scope of the invention, based on the arrangement disclosed in U.S. Pat. No. 6,235,852.

FIG. 3 is a further alternative arrangement outside the scope of the invention, based on the arrangement disclosed in U.S. Pat. No. 6,235,852. This arrangement utilises a single heat exchanger 4 as in FIG. 1, but in this case there is no bypass flow H. Instead, the exit flows D and E from each reactor can be recycled straight to the inlet flows B and C respectively via lines U and V respectively. Additionally, part of the exit flow D from the first reactor can be passed direct to the inlet flow C of the second reactor via line W.

The key requirement for the cooling circuit in the arrangement of FIGS. 1 to 3 is the temperature of flows B and C or L and M, which are dictated by the cooling requirements of the two reactors in each case. The following Examples show how the cooling is controlled by adjusting the various flows, and also how a particular cooling requirement dictates the capacity of the heat exchanger which is required.

In the Examples below, the temperatures and flowrates in the cooling circuits have been calculated based on particular scenarios for a slurry polymerisation conducted in two reactors operating in series, both of which require cooling.

Operation of the cooling circuit shown in FIG. 1 can be described in more detail with reference to FIG. 4, where the various controllers and signals involved are shown diagrammatically for Reactor 1 only.

Figure 4:
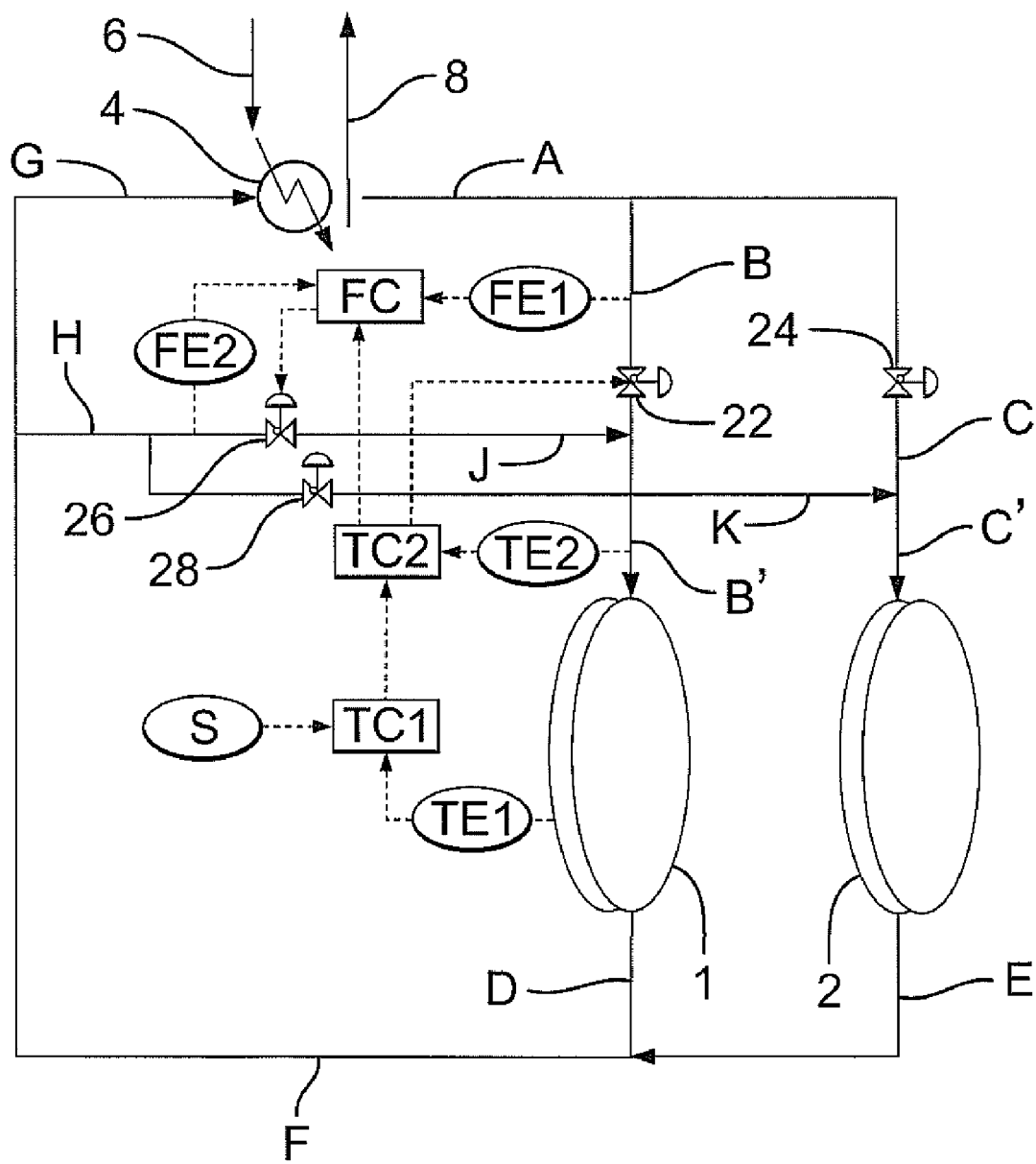
FIG. 4 is a schematic diagram showing one or a number of temperature transmitters located in Reactor 1 generate a signal or signals TE1 corresponding to the reactor temperature.

Referring to FIG. 4, one or a number of temperature transmitters located in Reactor 1 generate a signal or signals TE1 corresponding to the reactor temperature. The signal, or an average of a number of signals, is transmitted to the reactor temperature controller TC1. In response to this signal and its comparison with a preset temperature value S, the temperature controller TC1 sends an output signal to the first reactor coolant temperature controller TC2. This controller compares the signal with the input signal TE2 from a temperature transmitter located in the first reactor coolant line B', and based on the difference between the two signals sends an output signal to valve 22 controlling cold flow B, and also to the first reactor coolant flow controller FC.

In response to this output signal from the first reactor coolant temperature controller TC2, the cold flow control valve 22 for flow B opens (or closes). Meanwhile the first reactor coolant flow controller FC subtracts the received output signal from TC2 from the sum of the output signals coming from the flow measures FE1 and FE2 of the cold and the "warm" coolant flows B and J to Reactor 1, and sends the resulting value as a signal to control valve 26 controlling the "warm" flow J, which in turn closes (or opens). The flow controller FC ensures that the sum of the cold and "warm" coolant flows to the first reactor typically remains unchanged.

As an example, when the temperature set point S of the reactor is decreased, requiring more cooling, the temperature controller TC1 compares the set point S to the measured reactor temperature TE1 resulting in a signal to the coolant temperature controller TC2 to reduce the temperature set point. This controller compares the reduced set point with the measured coolant temperature TE2, and as a result sends an increased signal to the cold coolant flow valve 22. The valve 22 opens further, resulting in more cold flow. In parallel, the flow controller FC subtracts the increased value received from the temperature controller TC2 from the sum of the output values of the flow transmitters FE1 and FE2, and sends the resulting lower signal to the "warm" coolant flow valve 26. The valve 26 closes further, resulting in a reduced "warm" flow J.

The same control scheme is applied to Reactor 2.

EXAMPLES

EXAMPLE 1 (FIG. 1)

In this Example according to the invention, the two reactors are connected in series and are operating a slurry polymerisation at a production rate of 40000 kg polymer/hour. The temperature of the polymerisation in Reactor 1 is 95.0° C., and the temperature in Reactor 2 is 85.0° C. Their proportion of total production is the same (ie 50%).

In Table 1 below, the details of the various flows labelled in FIG. 1 are given. The flow of cold water 6 from the cold reservoir is fixed at 2500 m³/hour, and its temperature is fixed at 30.0° C. Therefore the size of the heat exchanger is dictated solely by the cooling requirements of the two reactors.

TABLE 1

| Flow | Fraction of split flow (%) | Flowrate (m³/hour) | Temperature (° C.) |
|------|----------------------------|---------------------|---------------------|
| 6    |                            | 2500                | 30.0                |
| 8    |                            | 2500                | 42.8                |
| A    |                            | 1200                | 37.8                |
| B    | 34.7                       | 417                 | 37.8                |
| C    | 65.3                       | 783                 | 37.8                |
| B'   | 42.4                       | 678                 | 48.0                |
| C'   | 57.6                       | 922                 | 41.8                |
| D    | 42.4                       | 678                 | 71.6                |
| E    | 57.6                       | 922                 | 59.1                |
| F    |                            | 1600                | 64.4                |
| G    | 75.0                       | 1200                | 64.4                |
| H    | 25.0                       | 400                 | 64.4                |
| J    | 65.4                       | 261                 | 64.4                |
| K    | 34.6                       | 139                 | 64.4                |

As can be seen, the heat exchanger is required to cool 1200 m³/hour of water from 64.4° C. to 37.8° C., using a flow of 2500 m³/hour of water having a temperature of 30° C. This is calculated to require a heat exchange area of 915 m².

EXAMPLE 2

FIG. 1

In this Example according to the invention, the same two reactors as in Example 1, operating under the same conditions, are considered. The single difference from Example 1 is that in the cooling circuit, the split between flows B and C is changed from 34.7/65.3 to 36.7/63.3.

In Table 2 below, the details of the various flows labelled in FIG. 1 are given.

TABLE 2

| Flow | Fraction of split flow (%) | Flowrate (m³/hour) | Temperature (° C.) |
|---|---|---|---|
| 6 |  | 2500 | 30.0 |
| 8 |  | 2500 | 42.8 |
| A |  | 1200 | 38.3 |
| B | 36.7 | 441 | 38.3 |
| C | 63.3 | 759 | 38.3 |
| B' | 48.0 | 768 | 49.7 |
| C' | 52.0 | 832 | 40.7 |
| D | 48.0 | 768 | 70.6 |
| E | 52.0 | 832 | 59.9 |
| F |  | 1600 | 65.0 |
| G | 75.0 | 1200 | 65.0 |
| H | 25.0 | 400 | 65.0 |
| J | 81.9 | 327 | 65.0 |
| K | 18.1 | 73 | 65.0 |

It can be seen that the slight change in the split of flow A results in a significant difference in flows J and K compared with Example 1.

In this Example, the heat exchanger is required to cool 1200 m³/hour of water from 65.0° C. to 38.3° C., which requires a heat exchange area of 874 m², less than in Example 1. This shows how it is possible to reduce the heat exchange demands by optimising the split of flows, subject to certain contraints such as the desire never to reduce any of the flows to zero.

EXAMPLE 3

FIG. 2—Comparative

In this Example, the same two reactors as in Examples 1 and 2 are considered. Again they are operating a slurry polymerisation at a production rate of 40000 kg polymer/hour. The temperature of the polymerisation in Reactor 1 is 95.0° C., and the temperature in Reactor 2 is 85.0° C. Their proportion of total production is the same, 50%. However in this case each reactor has its own independent cooling circuit and heat exchanger. As in Example 1 the total flow of cold water from the cooling tower is fixed at 2500 m³/hour and its temperature is fixed at 30.0° C., but in this case the water is split equally between each heat exchanger at 1250 m³/hour.

In Table 3 below, the details of the various flows labelled in FIG. 2 are given. The size of each heat exchanger is dictated solely by the cooling requirement of the reactor with which it is connected.

TABLE 3

| Flow | Fraction of split flow (%) | Flowrate (m³/hour) | Temperature (° C.) |
|---|---|---|---|
| REACTOR 1 | | | |
| 9 |  | 1250 | 30.0 |
| 10 |  | 1250 | 42.8 |
| L |  | 600 | 43.6 |
| L' |  | 800 | 50.2 |
| N |  | 800 | 70.2 |
| Q | 75 | 600 | 70.2 |
| S | 25 | 200 | 70.2 |

TABLE 3-continued

| Flow | Fraction of split flow (%) | Flowrate (m³/hour) | Temperature (° C.) |
|---|---|---|---|
| REACTOR 2 | | | |
| 17 |  | 1250 | 30.0 |
| 18 |  | 1250 | 42.8 |
| M |  | 600 | 33.6 |
| M' |  | 800 | 40.2 |
| P |  | 800 | 60.2 |
| R | 75 | 600 | 60.2 |
| T | 25 | 200 | 60.2 |

As can be seen, each heat exchanger is required to cool 600 m³/hour of water using a flow of 1250 m³/hour of water having a temperature of 30° C. In the case of Reactor 1, the required cooling is from 70.2° C. to 43.6° C., which is calculated to require a heat exchange area of 315 m². In the case of Reactor 2, the required cooling is from 60.2° C. to 33.6° C., which is calculated to require a heat exchange area of 710 m². Thus the total heat exchange area required using two separate cooling circuits is 1025 m², compared with 915 m² in Example 1.

EXAMPLE 4

FIG. 3—Comparative

In this Example, the same two reactors as in Examples 1 to 3 are considered. Again they are operating a slurry polymerisation at a production rate of 40000 kg polymer/hour. The temperature of the polymerisation in Reactor 1 is 95.0° C., and the temperature in Reactor 2 is 85.0° C. Their proportion of total production is the same, 50%. As in Example 1, there is a single heat exchanger, with the total flow of cold water from the cooling tower fixed at 2500 m³/hour and its temperature is fixed at 30.0° C. However in this case instead of the bypass arrangement of FIGS. 1 and 2, the arrangement of FIG. 3 is employed. Thus three bypass flows U, V and W exist, and each of them comprises part of the flow from a single reactor, rather than part of the combined flow from the two reactors (as is the case in Example 1).

In Table 4 below, the details of the various flows labelled in FIG. 3 are given.

TABLE 4

| Flow | Fraction of split flow (%) | Flowrate (m³/hour) | Temperature (° C.) |
|---|---|---|---|
| 6 |  | 2500 | 30.0 |
| 8 |  | 2500 | 42.8 |
| A | 100 | 1200 | 36.4 |
| B | 37.8 | 454 | 36.4 |
| C | 62.2 | 746 | 36.4 |
| B' | 42.4 | 678 | 48.0 |
| C' | 57.6 | 922 | 41.8 |
| D | 55.7 | 378 | 71.6 |
| E | 89.2 | 822 | 59.1 |
| U | 33.0 | 224 | 71.6 |
| W | 11.3 | 77 | 71.6 |
| V | 10.8 | 100 | 59.1 |
| F = G | 100 | 1200 | 63.1 |

In this Example, the heat exchanger is required to cool 1200 m³/hour of water from 63.1° C. to 36.4° C., which requires a heat exchange area of 1029 m², compared with 915 m² in Example 1.

EXAMPLE 5

FIG. 3—Comparative

In this Example, the same reactor set-up as in Example 2 is considered, but with the arrangement of FIG. 3. The single difference from Example 4 is that in the cooling circuit, the split between flows B and C is changed from 34.7/65.3 to 36.7/63.3.

In Table 5 below, the details of the various flows labelled in FIG. 3 are given.

TABLE 5

| Flow | Fraction of split flow (%) | Flowrate (m³/hour) | Temperature (° C.) |
|---|---|---|---|
| 6 | | 2500 | 30.0 |
| 8 | | 2500 | 42.8 |
| A | 100 | 1200 | 37.5 |
| B | 40.4 | 485 | 37.5 |
| C | 59.6 | 715 | 37.5 |
| B' | | 768 | 49.7 |
| C' | | 832 | 40.7 |
| D | 63.1 | 485 | 70.6 |
| E | 86.0 | 715 | 59.9 |
| U | 36.9 | 283 | 70.6 |
| W | 0 | 0 | — |
| V | 117 | 14.0 | 59.9 |
| F = G | 100 | 1200 | 64.2 |

In this Example, the heat exchanger is required to cool 1200 m³/hour of water from 64.2° C. to 37.5° C., which requires a heat exchange area of 932 m², compared with 874 m² in Example 2.

EXAMPLE 6

FIG. 1

In this Example according to the invention, the same two reactors as in Example 1 are considered, but operating under the different conditions. In this Example, both reactors are operating at the same temperature (92.0 C), but Reactor 1 is taking 60% of the production, and Reactor 2 the remaining 40%. As a result, Reactor 1 has a greater cooling requirement than Reactor 2.

In Table 6 below, the details of the various flows labelled in FIG. 1 are given.

TABLE 6

| Flow | Fraction of split flow (%) | Flowrate (m³/hour) | Temperature (° C.) |
|---|---|---|---|
| 6 | | 2500 | 30.0 |
| 8 | | 2500 | 42.8 |
| A | | 1200 | 38.7 |
| B | 76.5 | 918 | 38.7 |
| C | 23.5 | 282 | 38.7 |
| B' | 63.3 | 1012 | 41.2 |
| C' | 36.8 | 588 | 52.6 |
| D | 63.3 | 1012 | 60.2 |
| E | 36.8 | 588 | 74.4 |
| F | | 1600 | 65.4 |
| G | 75.0 | 1200 | 65.4 |
| H | 25.0 | 400 | 65.4 |
| J | 23.5 | 94 | 65.4 |
| K | 76.5 | 306 | 65.4 |

In this case, the greater degree of cooling required for Reactor 1 is addressed by having a much greater flowrate of cooling water in that reactor (flow B') compared with Reactor 2, together with a much higher proportion of cold water (flow B).

In this Example, the heat exchanger is required to cool 1200 m³/hour of water from 65.4° C. to 38.7° C., which requires a heat exchange area of 849 m².

EXAMPLE 7

FIG. 2—Comparative

In this Example, the same two reactors as in Example 6 are considered, operating under the same conditions—both reactors are operating at the same temperature (92.0 C), but Reactor 1 is taking 60% of the production, and Reactor 2 the remaining 40%. However in this case as in Example 3 each reactor has its own independent cooling circuit and heat exchanger. Thus the total flow of cold water from the cooling tower is again 2500 m³/hour and its temperature is 30.0° C., but the water is split equally between each heat exchanger at 1250 m³/hour.

In Table 7 below, the details of the various flows labelled in FIG. 2 are given.

TABLE 7

| Flow | Fraction of split flow (%) | Flowrate (m³/hour) | Temperature (° C.) |
|---|---|---|---|
| REACTOR 1 | | | |
| 9 | | 1250 | 30.0 |
| 10 | | 1250 | 45.4 |
| L | | 600 | 30.3 |
| L' | | 800 | 38.3 |
| N | | 800 | 62.3 |
| Q | 75 | 600 | 62.3 |
| S | 25 | 200 | 62.3 |
| REACTOR 2 | | | |
| 17 | | 1250 | 30.0 |
| 18 | | 1250 | 40.2 |
| M | | 600 | 50.8 |
| M' | | 800 | 56.2 |
| P | | 800 | 72.2 |
| R | 75 | 600 | 72.2 |
| T | 25 | 200 | 72.2 |

As can be seen, each heat exchanger is required to cool 600 m³/hour of water using a flow of 1250 m³/hour of water having a temperature of 30° C. In the case of Reactor 1, which has 60% of the production, the required cooling is significant and requires flows L and L' to be at a particularly low temperature. Thus the cooling required by the heat exchanger is from 62.3° C. to 30.3° C., which is close to the cooling tower water temperature of 30.0° C. Consequently, the calculated heat exchange area is very considerable, at 1863 m². In the case of Reactor 2, the required cooling is from 72.2° C. to 50.8° C., which is calculated to require a heat exchange area of 191 m². Thus the total heat exchange area required using two separate cooling circuits is 2054 m², compared with 849 m² in Example 6.

This Example would not be practical in reality because the temperature of flow L is too close to that of the cooling tower water. It would be theoretically possible to address this by reducing the amount of bypass flow S such that flow L is greater and can therefore be at a higher temperature. However this has disadvantages for continuous operation because the bypass flow is required for flexibility.

EXAMPLE 8

FIG. 2—Comparative

This Example considers the same two reactors operating under the same conditions as in Example 7 above, except that in order to try to overcome the problem in Example 7 relating to Reactor 1, the amount of cooling water flow in the cooling circuit for Reactor 1 has been increased from 800 m³/hour to 1200 m³/hour.

In Table 8 below, the details of the various flows labelled in FIG. 2 are given. The details for Reactor 2 are the same as in Example 7.

TABLE 8

| Flow | Fraction of split flow (%) | Flowrate (m³/hour) | Temperature (° C.) |
|---|---|---|---|
| REACTOR 1 | | | |
| 9 | | 1250 | 30.0 |
| 10 | | 1250 | 45.4 |
| L | | 900 | 37.6 |
| L' | | 1200 | 42.9 |
| N | | 1200 | 58.9 |
| Q | 75 | 900 | 58.9 |
| S | 25 | 300 | 58.9 |
| REACTOR 2 | | | |
| 17 | | 1250 | 30.0 |
| 18 | | 1250 | 40.2 |
| M | | 600 | 50.8 |
| M' | | 800 | 56.2 |
| P | | 800 | 72.2 |
| R | 75 | 600 | 72.2 |
| T | 25 | 200 | 72.2 |

In this case, the calculated heat exchange area required for Reactor 2 remains at 191 m² as in Example 7. For Reactor 1, the temperature of flow L is now 37.6° C. instead of 30.3° C., and consequently the calculated heat exchange area is reduced to 723 m². Thus the total heat exchange area required using two separate cooling circuits is reduced to 914 m², compared with 2054 m² in Example 5 and 849 m² in the single cooling circuit version of Example 6. Clearly this arrangement is superior to that of Example 7. However the increase in cooling circuit flow from 800 m³/hour to 1200 m³/hour results in an increase in energy consumption to drive the cooling water pump, and the total heat exchange area required is still greater than that utilised by the invention, as shown in Example 6.

EXAMPLE 9

FIG. 3—Comparative

In this Example, the same two reactors operating under the same conditions as in Examples 6-8 are considered, but in this case utilising the cooling arrangement of FIG. 3. Thus because Reactor 1 is taking 60% of the production and Reactor 2 the remaining 40%, Reactor 1 has a greater cooling requirement than Reactor 2.

In Table 9 below, the details of the various flows labelled in FIG. 1 are given.

TABLE 9

| Flow | Fraction of split flow (%) | Flowrate (m³/hour) | Temperature (° C.) |
|---|---|---|---|
| 6 | | 2500 | 30.0 |
| 8 | | 2500 | 42.8 |
| A | | 1200 | 39.3 |
| B | 76.5 | 918 | 39.3 |
| C | 23.5 | 282 | 39.3 |
| B' | 63.3 | 1012 | 41.2 |
| C' | 36.8 | 588 | 52.6 |
| D | 70.6 | 715 | 60.2 |
| E | 82.5 | 485 | 74.4 |
| U | 9.3 | 94 | 60.2 |
| W | 20.0 | 203 | 60.2 |
| V | 17.5 | 103 | 74.4 |
| F = G | 100 | 1200 | 65.9 |

In this Example, the total heat exchange area required is 817 m², compared with 849 m² in Example 6. This is the only instance where the arrangement of FIG. 3 is beneficial compared with that of the invention, and is because Reactor 2 has a lower cooling requirement than Reactor 1.

EXAMPLE 10

FIG. 1

In this Example according to the invention, two smaller reactors connected in series are considered, operating a slurry polymerisation at a production rate of 25000 kg polymer/hour. The temperature of the polymerisation in Reactor 1 is 100.0° C., and the temperature in Reactor 2 is 85.0° C. Their proportion of total production is the same, 50%.

In Table 10 below, the details of the various flows labelled in FIG. 1 are given.

TABLE 10

| Flow | Fraction of split flow (%) | Flowrate (m³/hour) | Temperature (° C.) |
|---|---|---|---|
| 6 | | 1500 | 25.0 |
| 8 | | 1500 | 38.3 |
| A | | 750 | 39.9 |
| B | 27.8 | 208 | 39.9 |
| C | 72.2 | 542 | 39.9 |
| B' | 38.9 | 389 | 52.3 |
| C' | 61.1 | 611 | 43.0 |
| D | 38.9 | 389 | 78.0 |
| E | 61.1 | 611 | 59.3 |
| F | | 1000 | 66.6 |
| G | 75.0 | 1200 | 66.6 |
| H | 25.0 | 400 | 66.6 |
| J | 72.3 | 181 | 66.6 |
| K | 27.7 | 69 | 66.6 |

In this case, the greater degree of cooling required for Reactor 2 is addressed by having a much greater flowrate of cooling water in that reactor (flow C') compared with Reactor 2, together with a much higher proportion of cold water (flow C).

In this Example, the heat exchanger is required to cool 750 m³/hour of water from 66.6° C. to 39.9° C., which requires a heat exchange area of 370 m².

EXAMPLE 11

FIG. 2—Comparative

In this Example, the same two reactors as in Example 10 are considered, operating under the same conditions—both reactors are taking 50% of the production, but Reactor 1 is operating at 100° C. and Reactor 2 is operating at 85.0° C. However in this case as in the previous comparative examples, each reactor has its own independent cooling circuit and heat exchanger. Thus the total flow of cold water from the cooling tower is again 1500 m³/hour and its temperature is 25.0° C., but the water is split equally between each heat exchanger at 750 m³/hour.

In Table 11 below, the details of the various flows labelled in FIG. 2 are given.

TABLE 11

| Flow | Fraction of split flow (%) | Flowrate (m³/hour) | Temperature (° C.) |
|---|---|---|---|
| REACTOR 1 | | | |
| 9 | | 750 | 25.0 |
| 10 | | 750 | 38.3 |
| L | | 375 | 49.2 |
| L' | | 500 | 55.8 |
| N | | 500 | 75.8 |
| Q | 75.0 | 375 | 75.8 |
| S | 25.0 | 125 | 75.8 |
| REACTOR 2 | | | |
| 17 | | 750 | 25.0 |
| 18 | | 750 | 38.3 |
| M | | 375 | 34.2 |
| M' | | 500 | 40.8 |
| P | | 500 | 60.8 |
| R | 75 | 375 | 60.8 |
| T | 25 | 125 | 60.8 |

As can be seen, each heat exchanger is required to cool 375 m³/hour of water using a flow of 750 m³/hour of water having a temperature of 25° C. In the case of Reactor 2, which is operating at 85.0° C., the required cooling is significant and requires flows M and M' to be at a particularly low temperature. Thus the cooling required by the heat exchanger is from 60.8° C. to 34° C., which gives a calculated heat exchange area of 261 m². In the case of Reactor 2, the required cooling is less, and is calculated to require a heat exchange area of 128 m². Thus the total heat exchange area required using two separate cooling circuits is 389 m², compared with 370 m² in Example 6.

EXAMPLE 12

FIG. 3—Comparative

In this Example, the same two reactors as in Example 10 and 11 are considered, operating under the same conditions, but utilising the cooling arrangement of FIG. 3.

TABLE 12

| Flow | Fraction of split flow (%) | Flowrate (m³/hour) | Temperature (° C.) |
|---|---|---|---|
| 6 | | 1500 | 25.0 |
| 8 | | 1500 | 38.3 |
| A | | 750 | 39.1 |
| B | 34.2 | 257 | 39.1 |
| C | 65.8 | 493 | 39.1 |
| B' | 38.9 | 389 | 52.3 |
| C' | 61.1 | 611 | 43.0 |
| D | 66.0 | 257 | 78.0 |
| E | 80.7 | 493 | 59.3 |
| U | 34.0 | 132 | 78.0 |
| W | 0 | 0 | — |
| V | 19.3 | 118 | 59.3 |
| F = G | 100 | 750 | 65.7 |

In this case the cooling required by the heat exchanger is from 60.8° C. to 34° C., which gives a calculated heat exchange area of 387 m², compared with 370 m² in Example 10.

In summary, the above Examples above show clearly that using a single cooling circuit for a two (or more) reactor polymerisation system rather than two circuits can result in significant savings both in capital costs (construction of only one cooling circuit, heat exchanger system, cooling water pump etc) and also potentially in energy consumption. Compared with the arrangement of FIG. 3, a significant benefit of the invention is its flexibility. The maximum heat exchange area required by the arrangement of the invention in the cases illustrated above is 915 m² in Example 1, whereas it is 1029 m² in Example 4. Any cooling system has to be designed to be suitable for a range of reactor conditions and sizes, and therefore must be sized to cope with the maximum likely cooling load. Thus even though the arrangement of FIG. 3 can be beneficial in specific instances such as the set-up of Examples 6-9, the heat exchanger of FIG. 3 would have to be larger than that of FIG. 1 in order to be able to deal with reactor conditions such as those in Examples 1 and 4. Thus utilising the arrangement of the invention enables the size of the heat exchanger to be reduced. Additionally, if at any stage it is required to apply maximum cooling capacity to both reactors, in the process of the invention it is simply necessary to shut off a valve to close the bypass line H, and the pump in line F will still have the same flow going through it. However in the arrangement of FIG. 3, closing the bypass lines U, V and W means that the pump in line F will experience a higher flow, and will need to be adjusted. This can cause problems as the required higher flow is not delivered instantaneously, meaning that the required maximum cooling capacity is also not delivered instantaneously.

A further advantage of the invention compared with the arrangement of FIG. 3 is that it is simpler, with fewer lines and pumps. This leads to significant capital cost savings. The flow through the various lines in FIG. 3 is also much more variable than that through the lines of the invention, which means that variable speed rather than constant speed pumps are required, further adding to the cost and complexity.

The invention claimed is:

1. A process for removing heat from at least two reactors forming at least part of a polymerisation reactor system for a multimodal polymerisation in which the reactors are linked in series and all produce at least one component of the same polymer, said process comprising:
    cooling a stream of fluid in one or more heat exchangers and passing part of it to the cooling system of a first reactor and part of it to the cooling system of a second reactor, so as to remove the heat from said reactors;
    passing back through the heat exchangers a return flow comprising a portion of the combined exit flows of the cooling fluids used to remove the heat from each of the reactors;
    wherein the heat exchangers provide at least 90% of the cooling requirement for the reactors, and a portion of the combined exit flows from the reactors bypasses at least one of the heat exchangers and is passed directly to the cooling system of one or more of the reactors, and wherein the cooling circuit is powered by no more than one pump at any one time.

2. The process according to claim 1, wherein a portion of the return flow bypasses all of the heat exchangers.

3. The process according to claim 1, wherein part of the portion of the return flow which bypasses the heat exchangers passes into the cooling system of the first reactor, and part of it passes into the cooling system of the second reactor.

4. The process according to claim 1, wherein the cooling circuit is a closed circuit.

5. The process according to claim 1, wherein the pump is located in the return flow comprising the combined exit flows from the two reactors.

6. The process according to claim 1, wherein the pump is located upstream of the separation of the return flow into two portions.

7. The process according to claim 1, wherein the cooling system for each reactor is a jacket or jackets surrounding the reactor over part or all of its surface.

8. The process according to claim 1, wherein the reactors are loop reactors.

9. The process according to claim 1, wherein the total cooling capacity of the heat exchangers is less than 90% of the sum of the individual maximum cooling requirements of each of the reactors.

* * * * *